Oct. 19, 1971 R. PERRENOUD 3,613,420
AUTOMATIC MACHINE FOR THE MANUFACTURE OF PLANAR
STEEL WIRE SPRINGS
Filed May 26, 1969 5 Sheets-Sheet 1
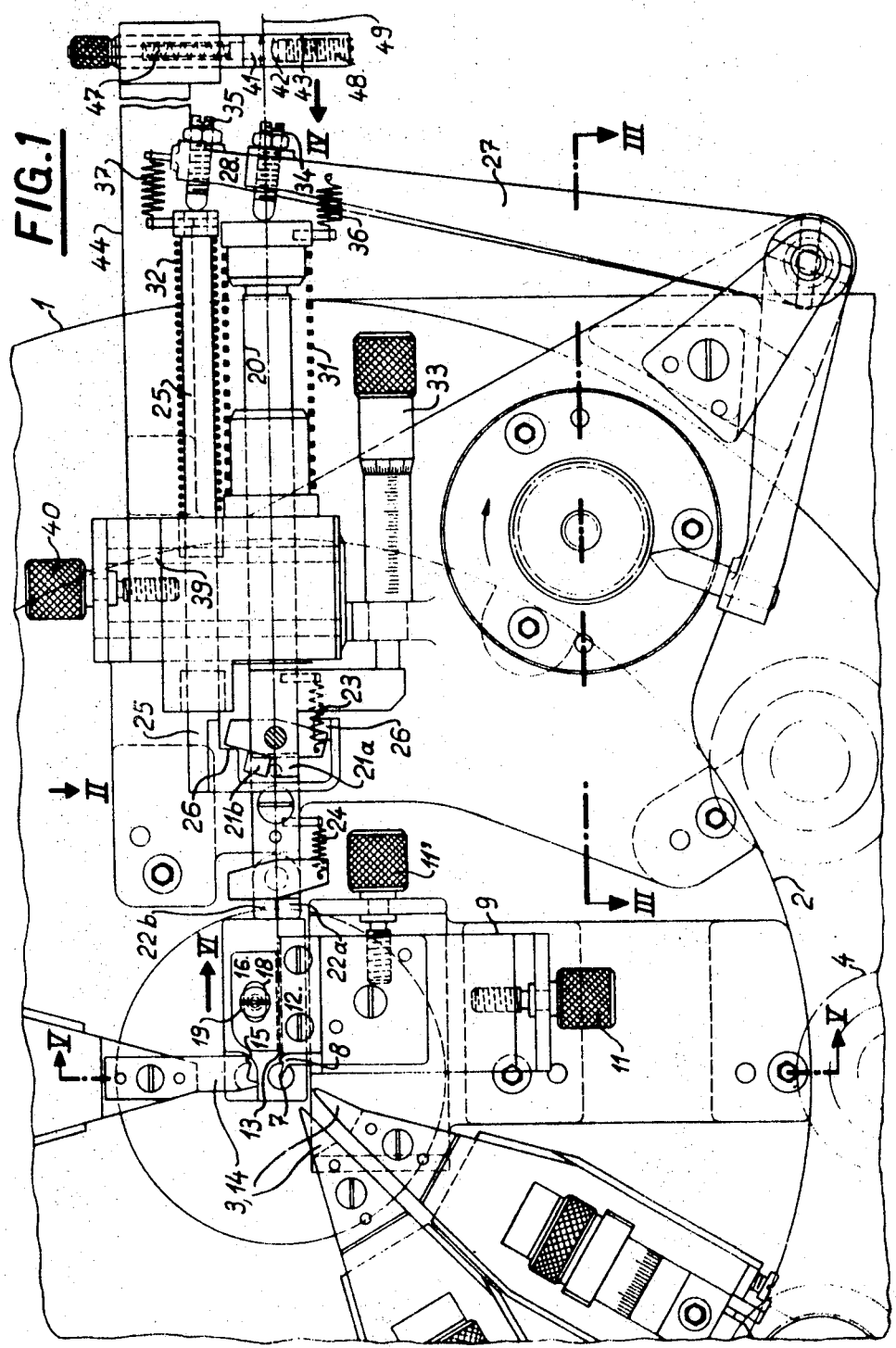

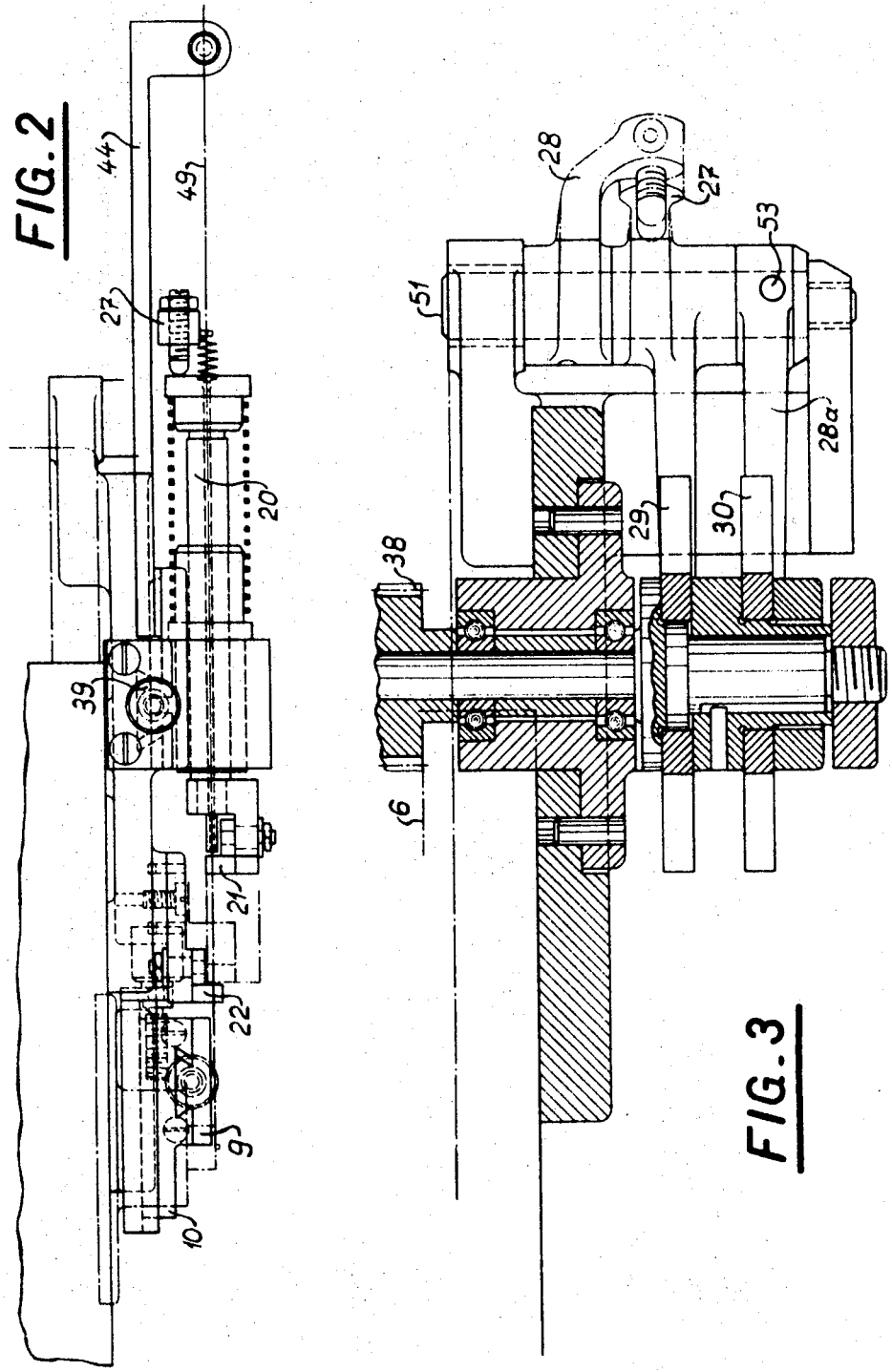

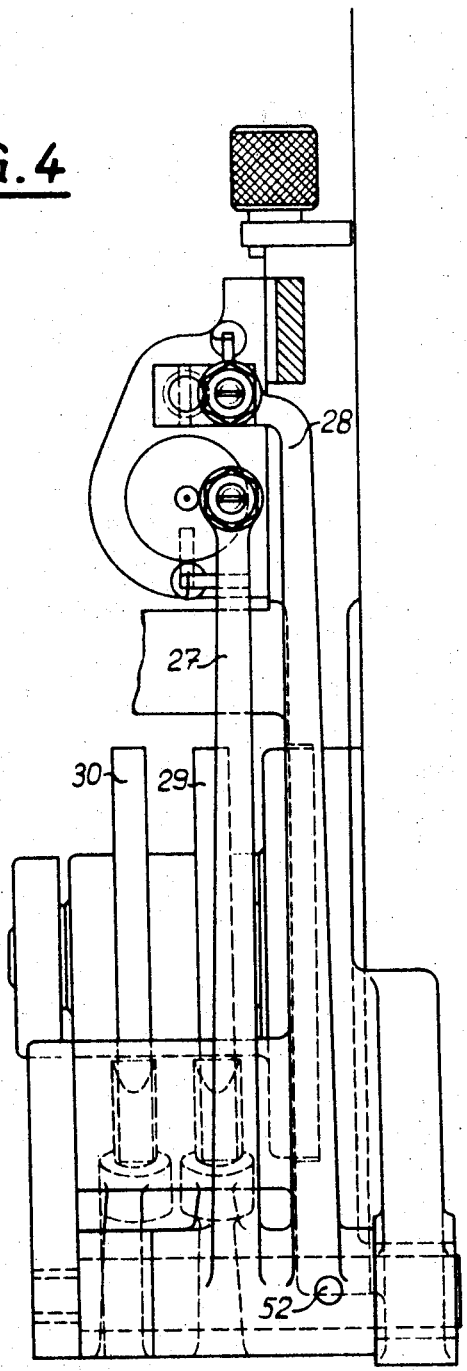

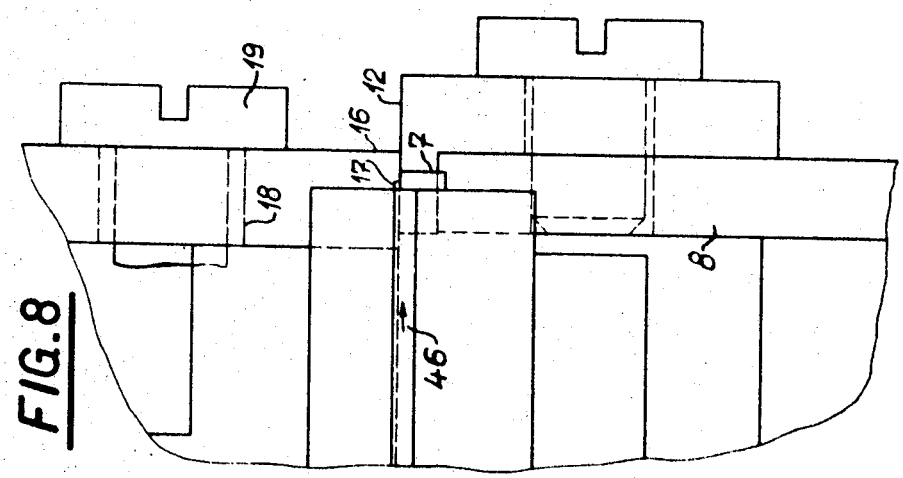
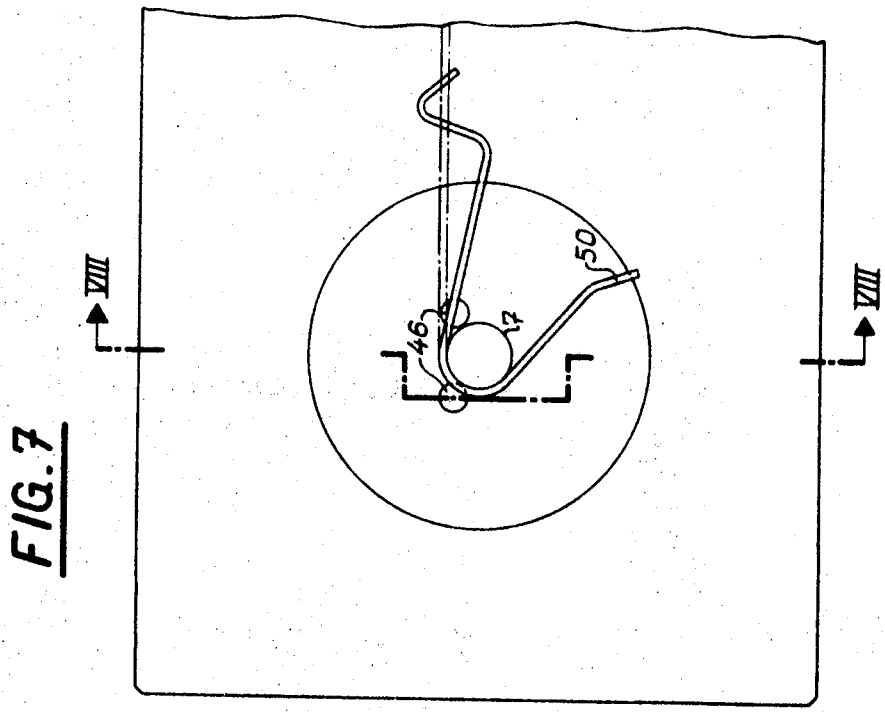

United States Patent Office 3,613,420
Patented Oct. 19, 1971

3,613,420
AUTOMATIC MACHINE FOR THE MANUFACTURE OF PLANAR STEEL WIRE SPRINGS
Rene Perrenoud, 14 Sugits, 2114 Fleurier, Switzerland
Filed May 26, 1969, Ser. No. 827,535
Claims priority, application Sweden, Apr. 23, 1969, 6,109/69
Int. Cl. B21f *11/00;* B21d *43/10*
U.S. Cl. 72—131                                                4 Claims

ABSTRACT OF THE DISCLOSURE

A machine for the manufacture of planar steel wire springs, notably for timepieces, comprises a plate member on which are slidably mounted forming tools sliding in the direction of the center of the plate, means for advancing the wire, and means for clamping and cutting the wire. The means for advancing the wire extend parallel to the plate member to ensure an advance of the wire parallel to the plate member and the advancing means comprises a clamping device for the wire and a braking device for the wire co-operating with the clamping device to maintain the wire under tension.

---

The object of the present invention is to provide an automatic machine for the manufacture of planar steel wire springs, notably timepiece springs.

Machines comprising a plate member on which forming tools sliding in the direction of the center of the plate are mounted and wherein the wire arrives through the center of the plate, are known. These machines however do not enable springs of various shapes extending in a precise manner in one plane to be obtained.

When the wire used is very thin, it is additionally preferable that the wire be maintained under tension during its automatic advance so as to prevent deformation thereof by skin-drying.

An object of the present invention is to provide an automatic machine for the manufacture of planar steel wire springs, notably for timepieces, comprising a plate member on which are mounted forming tools sliding in the direction of the center of the plate member, means to advance the wire, means for screwing and cutting the wire, the machine being characterised by the fact that the means for advancing the wire extend parallel to the plate to ensure an advance of the wire parallel to the plate member and wherein the advancing means comprises a device for screwing the wire and a device for braking the wire cooperating with the device for clamping to maintain the wire under tension.

The accompanying drawing shows, by way of example, an embodiment of the invention.

FIG. 1 shows a partial elevational view thereof.

FIG. 2 shows a plan view according to II—II of the advancing device.

FIG. 3 shows a cross-section along III—III of FIGURE 1.

FIG. 4 shows a side view along IV—IV of the advance device and its control cam.

FIG. 7 shows a detailed face of the central part of the plate according to VII of FIG. 5.

FIG. 8 shows a cross-section along VIII—VIII of FIG. 7.

Figure 5:
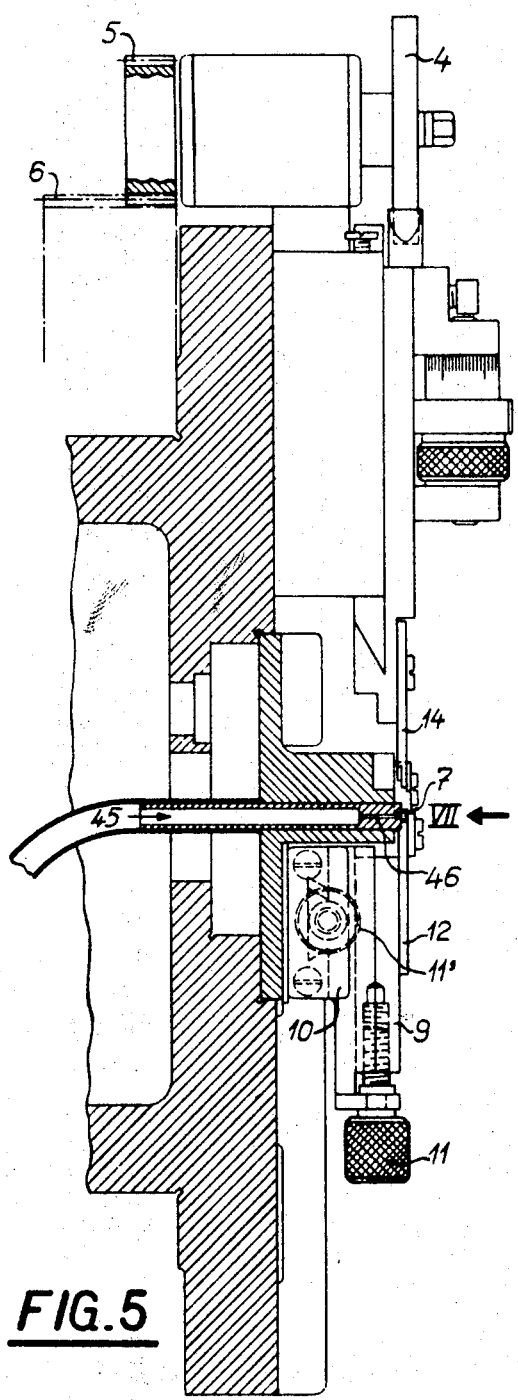
FIG. 5 shows a cross-section along V—V of FIG. 1.
Figure 6:
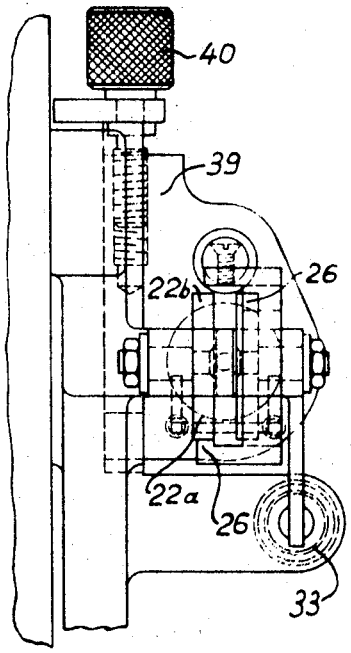
FIG. 6 shows a side view according to VI of the device for advance, clamping and cutting.

The machine shown in the drawing comprises a frame 1 on which is fixed a circulate member 2 slidably carrying thereon a sliding tool 3 serving as a stamp and arranged in a crown and controlled by cams 4 driven by pinion 5 and a toothed gear 6. The tools are successively actuated according to a predetermined cycle and moved to a working position to form a spring on a round or shaped eye-piece 7 and on a small shaped plate 8 arranged on the same plane as the eye-piece 7 and serving as matrix. The matrix is fixed on a slider 9 mounted to undergo vertical displacement and the slider 9 is fixed on a slider 10 mounted to undergo horizontal displacement enabling the precise positioning of the matrix 8. Adjustment is carried out by means of two adjusting screws 11 and 11'.

The matrix 8 supports a small plate in the shape of a T-square 12 (FIG. 8) supporting the wire at its arrival near to the bending shape and having a cutting edge 13 functioning as a cutting knife for the wire upon the simultaneous formation of the spring by the stamp 14 which also has a cutting edge 15 which effects shearing of the wire. The small plate 16 has means therein defining a groove 17 (FIG. 8) serving to guide the wire and to maintain it parallel to the bending device. To effect horizontal and vertical adjustment of the small plate 16, an oblong opening 18 is provided therein in which a fixing screw 19 engages.

The device for advancing the wire comprises a sliding shaft 20 drilled with an axial hole by which the wire arrives at the center of the plate.

The advance of the wire accomplished by a device having two gripper assemblies 21 and 22, the gripper assembly 21 being fixed at one extremity of the shaft 20 and movable therewith while the gripper assembly 22 is fixed. Each gripper assembly comprises a fixed jaw 21a, 22a respectively, a movable jaw 21b, 22b respectively, and a spring 23, 24 respectively biasing the movable jaw into engagement with the fixed jaw. The gripper assemblies 21 and 22 are alternately opened or released by a sliding shaft 25 having at its extremity a nose portion 26 which alternately comes into abutment with the levers carrying the movable jaws in a manner to alternately open the grippers in response to axial displacement of the shafts 25. In FIG. 1 the gripper assembly 21 is shown opened by the nose portion 26 while the gripper 22 is biased closed.

The advance of the shafts 20 and 25 is effected by levers 27 and 28 controlled by cams 29 and 30, respectively (FIG. 4) while the withdrawal of these shafts is ensured by the springs 31 and 32. A micrometric screw 33 (FIG. 1) limits the withdrawal of the gripper carrying shaft 20 and starts to advance the wire, the advance position of the gripper assembly 21 always being the same. The shafts 20 and 25 thus comprise actuating means for moving the gripper assembly 21 relative to the gripper assembly 22 and for alternately disengaging the movable jaws 21b and 22b from the stationary jaws 21a and 21b.

All of the advance device of the wire except for the control lever is mounted on a vertical pulley 39 which is selectively adjustable by a screw 40 in such a manner to present the wire at the correct height on the eyepiece 7 and the matrix 8.

The levers 27 and 28 cooperate respectively with adjustment screws 34 and 35 and springs 36 and 37 whereby the levers are maintained against the shafts 20 and 25.

The lever arm 28 is solid with the axle 51 by means of a pin 52. The axle 51 is solid with an arm 28a by a pin 53. The arm 27 is free on the axle.

The cams 29 and 30 are solid with a pinion 38 (FIG. 3) engaging with the toothed gear 6 which is driven by the motor of the machine.

In order to maintain the proper wire tension during the advance thereof, there is provided a braking device consisting of a piston 41 urged in one direction by a spiral spring 47 to push the wire against a capsule 42, the height of which can be adjusted by means of a screw 43 which is locked in place by a screw 48. This braking device is connected to the slider 39 by a support 44 in a manner to follow the advance device of the wire upon adjustment of its height. A conduit 45 for compressed air (FIG. 5) enables extraction of the finished spring by projection of air by two orifices 46 (FIG. 7).

In operation, the wire 49 is driven by the gripper assembly 21 and advances along the desired length above the eye-piece 7, in which position it is maintained by the gripper assembly 22. As soon as the wire is held stationary, the sliding tools are actuated and form, by their successive operation, a spring of the desired shape for example that shown at 50 in FIG. 7. The wire is then simultaneously cut by the cutting edges 13 and 15 and then ejected.

To obtain other shapes of springs, it suffices to change the tools and/or their control cams as well as the matrix 8.

I claim:

1. In a machine for manufacturing springs from wire, a plate member; forming tools slidably mounted on said plate member slidable to a working position to form a length of wire into a spring; advancing means for advancing a wire to be formed into a spring to said forming tools comprising first and second gripper assemblies each having a stationary jaw and a movable jaw normally biased into engagement with said stationary jaw to releasably grip a wire therebetween, means mounting said first and second gripper assemblies for relative movement towards and away from each other, and actuating means for effecting relative movement between said first and second gripper assemblies and alternate movement of said movable jaws out of engagement with their respective stationary jaws to effect advancement of the wire parallel to said plate member; and braking means for applying a preselected braking force to the wire during advancement thereof to maintain the wire under a predetermined tension.

2. A machine according to claim 1; wherein said actuating means comprises a first shaft connected to said first gripper assembly, means mounting said first shaft for sliding movement towards and away from said second gripper assembly, a second shaft having a nose portion, means mounting said second shaft for sliding movement towards and away from said plate member whereby said nose portion effects alternate disengagement of said movable jaws from their respective stationary jaws, and means for effecting sliding movement of said first and second shafts.

3. A machine according to claim 2; wherein said means for effecting sliding movement of said first and second shafts comprises a pivotally mounted shaft, a pair of levers connected at one end to said pivotally mounted shaft and having their other ends in contact with an end portion of respective ones of said first and second shafts, spring means biasing said other ends of said levers into contact with respective end portions of said first and second shafts, and means for effecting pivotal movement of said pivotally mounted shaft.

4. A machine according to claim 1; wherein said braking means comprises a pair of movable members positioned in spaced-apart relationship and having the wire extending therebetween, and means for forcing said pair of movable members into pressure contact with one another to apply a preselected braking force to the wire.

5. A machine according to claim 4; wherein said means for forcing said pair of movable members into pressure contact comprises spring means for urging one of said movable members towards the wire, and a threaded screw coacting with the other of said movable members to selectively force same into contact with said one movable member.

References Cited

UNITED STATES PATENTS

| | | | |
|---|---|---|---|
| 400,340 | 3/1889 | Hill | 72—131 |
| 2,360,047 | 10/1944 | Caminez | 72—131 |
| 3,296,851 | 1/1967 | Breuer | 72—452 |

CHARLES W. LANHAM, Primary Examiner

R. M. ROGERS, Assistant Examiner

U.S. Cl. X.R.

72—422